US007844977B2

(12) United States Patent
Krauss

(10) Patent No.: US 7,844,977 B2
(45) Date of Patent: Nov. 30, 2010

(54) IDENTIFYING UNNECESSARY SYNCHRONIZATION OBJECTS IN SOFTWARE APPLICATIONS

(75) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 11/676,783

(22) Filed: Feb. 20, 2007

(65) Prior Publication Data

US 2008/0201393 A1 Aug. 21, 2008

(51) Int. Cl.
*G06F 13/00* (2006.01)
(52) U.S. Cl. .................... 719/328; 718/100
(58) Field of Classification Search ........... 718/102, 718/100; 719/328
See application file for complete search history.

(56) References Cited

U.S. PATENT DOCUMENTS

| 5,822,588 | A | 10/1998 | Sterling et al. |
| 6,343,371 | B1 | 1/2002 | Flanagan et al. |
| 2001/0014905 | A1* | 8/2001 | Onodera ............. 709/102 |
| 2003/0056149 | A1 | 3/2003 | Hue |
| 2003/0236951 | A1 | 12/2003 | Choi et al. |
| 2005/0081206 | A1 | 4/2005 | Armstrong et al. |
| 2007/0074217 | A1* | 3/2007 | Rakvic et al. ............. 718/102 |
| 2008/0209422 | A1* | 8/2008 | Coha .................. 718/102 |

OTHER PUBLICATIONS

Anderson, et al., "Quartz: A Tool for Tuning Parallel Program Performance", Department of Computer Science and Engineering, University of Washington, pp. 115-125 (1989).
Choi, et al., "Efficient and Precise Datarace for Multithreaded Object-Oriented Programs", PLDI '02, Jun. 17-19, 2002, Berlin, Germany, pp. 1-12.
Savage, et al., *"Eraser: A Dynamic Data Race Detector for Multithreaded Programs"*, ACM Transactions on Computer Systems, vol. 15, No. 4, pp. 391-411 (1997).
Bernat, et al., "Multithreaded Support for Paradyn", Computer Sciences Department, University of Wisconsin-Madison, pp. 1-27 (2001).

* cited by examiner

*Primary Examiner*—Andy Ho
(74) *Attorney, Agent, or Firm*—Holland & Knight LLP; Brian J Colandreo, Esq.; V. Raman Bharatula

(57) ABSTRACT

Methods and apparatus, including computer program products, for identifying unnecessary synchronization objects in software applications. A computer-implemented method for determining a usefulness of synchronization objects includes, in a multi-threaded application program, tracking threads as they are created and terminated, intercepting application program interfaces (APIs) used to create and destroy thread synchronization objects, in the API wrappers, tracking existing synchronization objects in a list, and associating a list entry for each of the synchronization objects with a unique bit in a bit field.

18 Claims, 13 Drawing Sheets

Synchronization
Object   1          2              3                    4

IDENTIFYING UNNECESSARY SYNCHRONIZATION OBJECTS IN SOFTWARE APPLICATIONS

BACKGROUND

The present invention relates to data processing by digital computer, and more particularly to identifying unnecessary synchronization objects in software applications via runtime analysis.

In multi-threaded software applications, the problem of coordinating multiple threads or processes to share data or resources often arises. For example, when one process or thread is writing data to a memory location, other processes or threads may need to be prevented from writing to the same memory location at the same time in order to prevent data corruption from occurring. Also, processes or threads may need to be prevented from reading from the memory location while it is being written to, in order to ensure that partial or incorrect data is not read.

Software developers generally prefer to not utilize large numbers of synchronization objects (e.g., locks) in the development of multi-threaded application programs. Some software developers suggest using one common interface for protecting access to resources that are shared between a given application program's threads, i.e., a single common lock for use everywhere in an application. Although use of a common synchronization interface throughout a complex software application is not always practical, the introduction of additional methods of protecting access to shared resources can lead to pitfalls, including, for example, poor performance, race conditions, and deadlocks. For example, a multi-threaded software application running on a multiprocessor system may perform poorly when individual threads of the program protect a resource and thereby prevent other threads using that resource from operating, thus allowing one or more processors to idle while useful computations could have occurred. While performance bottlenecks are bad, the problems created by race conditions and deadlocks are typically even worse.

Thus if protection of a resource is unnecessary (i.e., unsuitable) during execution (e.g., because only one thread accesses the protected resource, or because the resource has existing protection that is unnecessarily augmented by the use of additional protection), then the software developer would be wise to remedy the situation. In some circumstances, the entire set of resources associated with a particular synchronization object receives adequate protection from additional synchronization objects, whenever those resources are accessed as the software application runs. In some other circumstances, the entire set of resources protected by a synchronization object needs no protection because only one thread accesses those resources as the software application runs. A straightforward way to remedy either of these situations is to altogether remove extraneous synchronization objects. For this reason, the software developer would benefit from a means of identifying any synchronization objects that can be determined to be unnecessary as the software application runs.

SUMMARY

The present invention provides methods and apparatus, including computer program products, for identifying unnecessary synchronization objects in software applications.

In general, in one aspect, a synchronization object method includes, in a multi-threaded application program, tracking threads as they are created and terminated, intercepting application program interfaces (APIs) used to create and destroy thread synchronization objects, e.g. via API wrappers, and tracking the existing synchronization objects in a list, and associating a list entry for each of the synchronization objects with a bit in a bit field. The method can include tracking a bit field, or set of bit fields, in which a unique bit is associated with each synchronization object that is used by the application program during a particular run.

The invention can be implemented to include one or more of the following advantageous features. The method can include tracking a list entry for each synchronization object. The list may be ordered and optimized for quick searching via an algorithm such as the skip list algorithm or the AVL tree algorithm. Each list entry can be associated with a unique data structure element including a field used as an identifier to identify a synchronization object, a field that serves as a thread-specific copy of the global bit field in which a particular bit is associated with the same synchronization object to further identify it, a field representing a singleton count indicating a number of resource accesses that have been intercepted while the synchronization object was held and no other synchronization objects were held, a field representing a non-singleton count indicating a number of resource accesses that have been intercepted while the synchronization object was held together with other synchronization objects, a field representing a reference to a list of call chains, a field representing a reference to a list of threads that can be currently waiting for the synchronization object, if any are waiting, and a field representing flags to indicate whether the synchronization object is determined via runtime analysis to be unused, unnecessary, or potentially unnecessary.

In embodiments, the method can include wrapping thread synchronization APIs, in each of the wrappers, tracking synchronization objects held by each thread at any given time, and for each thread synchronization API wrapper, tracking or updating a list entry associated with the data structure element described in paragraph 7.

The method can include intercepting thread creation and destruction and associating each existing thread with an entry in an ordered list. Each of these thread-specific list entries can be associated with a data structure element including a field representing a thread ID or handle, a field representing an instance of the synchronization object bit field, with a bit set for each object currently held by that thread, a field representing a count of the largest number of those bits ever set at once, and a field representing a call chain, to be collected each time that count is incremented.

The method can include intercepting and tracking memory allocations and deallocations, and for each allocated resource (e.g. memory block), tracking an entry in an ordered list. The list entry can be a data structure element including a field representing a pointer to the tracking structure representing the thread that allocated that memory block, a field representing a copy of that thread's synchronization object bit field at the moment of the block's initialization, and a field representing a singleton counter indicating the number of times the block has been accessed while only one synchronization object was held. The data structure element can include a field representing a non-singleton counter indicating the number of times the block has been accessed while multiple synchronization objects were held, a field representing a call chain leading to the block's allocation, a field representing an address of the resource, and a field including optional flags.

The method can include intercepting heap memory access reads and writes.

DETAILED DESCRIPTION

Figure 1:
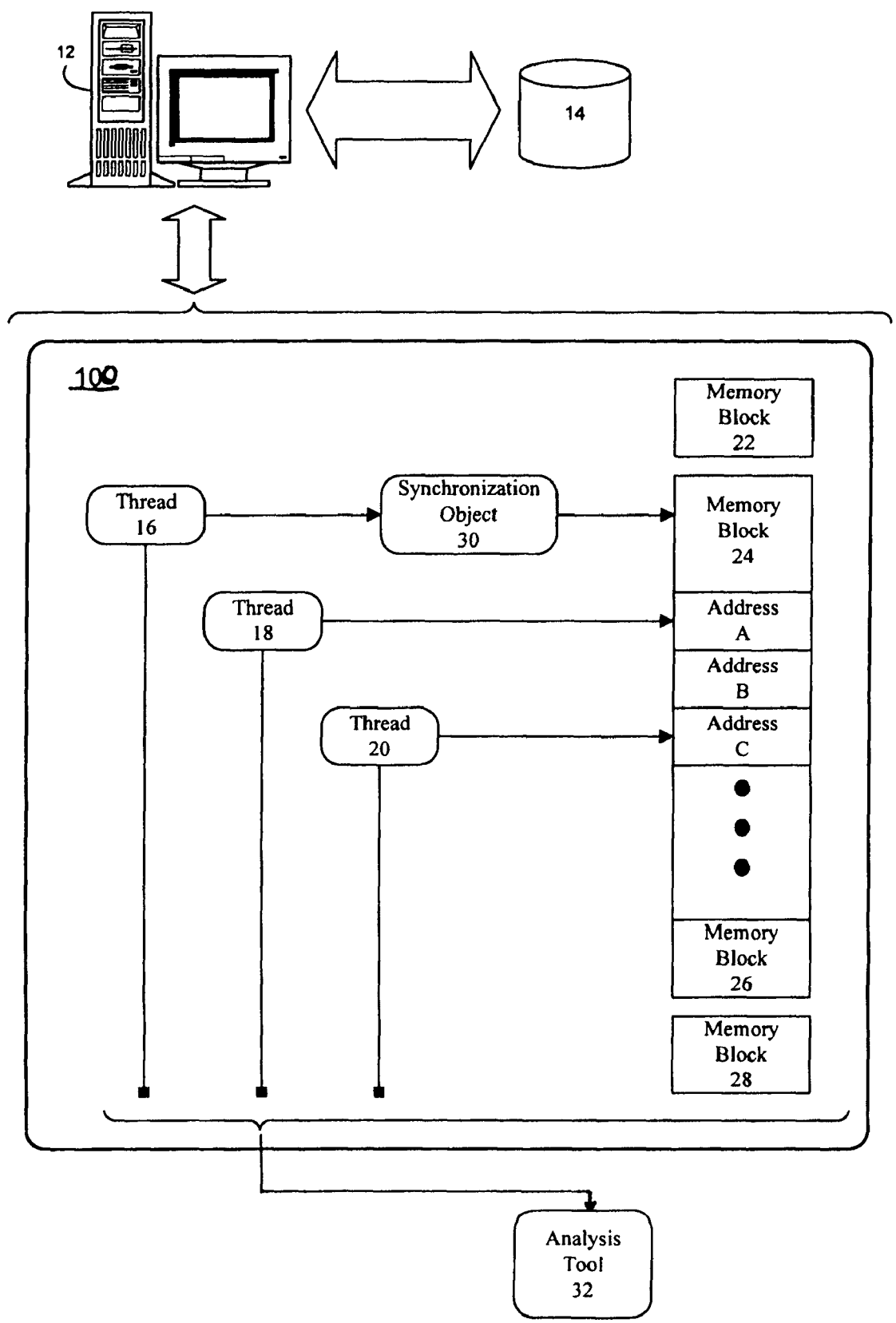
FIG. 1 is a block diagram.

Many programming languages, operating systems, and other software development environments support what are known as "threads" of execution. Each thread represents a single sequence of computer program instructions that can be executed in parallel with other sequences of instructions within a process that shares common resources among its constituent threads. Threads are executed in parallel within a computer system using technologies such as time slicing and preemption. In essence, threads provide a mechanism by which a computer program may "split itself" into two or more simultaneously running tasks.

Because threads are capable of operating in parallel, there may be a time in which more than one thread tries to access a given computer resource (e.g., a portion of memory) at the same time. In a typical case, a thread requires unshared access to a portion of memory during the time while a particular set of instructions is executing. That is, the thread reads and writes to a given portion of memory. During that time, if another thread writes to the same portion of memory, the data may become inaccurate or corrupted.

To avoid such a condition, synchronization objects, also referred to as "locks", are employed. Examples of synchronization objects may include, but are not limited to, defining a portion of code as a "critical section" that requires the use of a particular application programming interface (API), semaphores, or the like, for accessing the resource. In general, once a synchronization object is engaged by a "Thread A", the synchronization object may prevent a "Thread B" and a "Thread C" from also engaging the synchronization object. This causes "Thread B" and "Thread C", which must engage the synchronization object, to block (e.g., wait) until the synchronization object is removed or disengaged by "Thread A".

The present disclosure provides a detailed description of a runtime analysis process for identifying the synchronization objects that are no longer clearly serving a useful purpose such as minimizing performance overhead involved in the protection of shared resources in a computer program under test (CPUT). The runtime analysis process focuses on identifying overzealous acquisition of synchronization objects by a particular thread, and identifying unnecessary synchronization objects that protect resources, such as heap memory ranges, that are shared globally by a program's threads. The runtime analysis process can be extended to apply not only to heap memory blocks but also to global variables, memory-mapped ranges, and so forth. The result of this analysis can lead to suggested changes that not only may improve the application program's performance on multiprocessor systems but also may reduce the potential for race conditions and deadlocks.

A race condition can occur even when particular shared resources are associated with particular synchronization objects if in overlooked circumstances a thread is allowed to access a shared resource without first acquiring the appropriate synchronization objects. For this reason, synchronization objects can elicit a false sense of security when they are not used effectively. Race conditions often happen without notice, leading to downstream effects whose causes are often difficult to discover.

A deadlock condition typically involves threads waiting for each other to release synchronization objects that each thread respectively needs. This condition can occur whenever threads can acquire multiple synchronization objects, unless there is careful enforcement of the order in which the synchronization objects are acquired. The potential for a deadlock appears as soon as more than one synchronization object is in use. This potential can increase along with the number of synchronization objects. Deadlocks may occur in ways that are difficult to predict.

During execution of the CPUT, information relating to the use of synchronization objects by various threads may be collected. The synchronization object usage information may be analyzed to identify candidate portions of computer program code (included within the CPUT) that, according to analysis criteria, cause a higher than acceptable number of threads to wait unnecessarily for a given synchronization object. Since threads waiting for synchronization objects may waste significant computing time, bringing such portions of code to the attention of a software developer may aid in the optimization and improvement of the CPUT.

The various functions described herein may be implemented within a software analysis tool. In one particular example, the various functions described herein may be implemented as extensions of one or more members of the Rational® PurifyPlus™ family of software analysis tools that are commercially available from International Business Machines Corporation of Armonk, N.Y. (IBM). PurifyPlus is a family of computer programs that provides runtime analysis functionality to software developers and testers. In general, runtime analysis refers to the practice of analyzing and understanding application behavior using data collected during execution of a CPUT.

The various development activities that may be analyzed using PurifyPlus may include, but are not limited to, memory corruption detection and memory profiling in native C/C++ applications, memory profiling in Java and .NET managed code applications, performance profiling to identify slow or inefficient portions of code, code coverage analysis, and runtime tracing. PurifyPlus may also perform thread profiling. Thread profiling may entail inspecting and preventing intermittent hangs, data corruption, or performance degradation due to deadlocks, race conditions, and/or thread starvation.

As shown in FIG. 1, a runtime analysis process 100 is resident on (in whole or in part) and is executed by (in whole or in part) exemplary computer 12 (e.g., a single server computer, a group of server computers, or a general purpose computer, for example). The runtime analysis process 100, which can be included within the above-described software analysis tools, identifies ineffective utilization of synchronization objects in an application program and can include several sub-processes.

FIG. 1 is illustrative of the execution of a CPUT process, which may include a number of threads (e.g., threads 16, 18, 20). The instruction sets and subroutines of runtime analysis process 100, which may be stored on a storage device 14 coupled to computer 12, may be executed by one or more processors and one or more memory architectures incorporated into computer 12. Storage device 14 may include, but is not limited to, a hard disk drive, a tape drive, an optical drive, a redundant array of independent disks (RAID) array, a random access memory (RAM), or a read-only memory (ROM).

During execution of the CPUT, threads 16, 18, 20 may access heap memory blocks 22, 24, 26, 28. Access to memory blocks 22, 24, 26, 28 may be gained through various functions (e.g., "malloc" in the C programming language) or via other heap allocation mechanisms. Each memory block may be accessed through memory read and write operations such as register load and store instructions.

As shown, thread 16 has engaged synchronization object 30 to protect memory block 24. Analysis tool 32, such as one of the variety already described herein, may evaluate the execution of the CPUT, and note which threads have accessed which memory blocks and/or addresses within the memory blocks, for example. Runtime analysis process 100 may be a portion of or incorporated into analysis tool 32.

In order to track the different accesses of memory blocks 22, 24, 26, 28 by threads 16, 18, 20, analysis tool 32 may allocate a particular portion of memory referred to as a resource-specific bit field.

It should be appreciated, however, that other tracking schemes and runtime data allocation mechanisms may be used for tracking thread activity, synchronization object usage, resources protected by synchronization objects, and the timing of such activities. Accordingly, the present disclosure is not intended to be limited to the use of one particular technique or data structure. For example, ordinary linked lists, AVL trees, skip lists, and/or any other suitable data structures may also be used.

Returning to our example, the bit field may indicate that thread 16 has engaged synchronization object 30 to protect memory block 24. Alternatively, in a more rigorous example in which each individual memory address is associated with its own bit field tracking, a bit field may further be associated with a specific address (within a memory block) that is accessed by threads. For example, the bit field may indicate that thread 18 attempted to access "Address A" of memory block 24 and that thread 20 attempted to access "Address C" of memory block 24.

It should be appreciated that FIG. 1 is presented for illustrative purposes only and that the present detailed description is not intended to be restricted by the number of threads or memory blocks shown. A CPUT may include a greater or lesser number of threads and/or a greater or lesser number of memory blocks. Further, although memory blocks are shown to illustrate particular aspects of the present disclosure, it should be appreciated that the arrangements disclosed herein may be applied to other resources that may be protected and/or regulated through the use of synchronization (e.g., individual memory addresses; peripheral devices; and any other resource that may require synchronized access). Accordingly, the present disclosure is not intended to be limited solely to the observation of memory block access.

Figure 2:
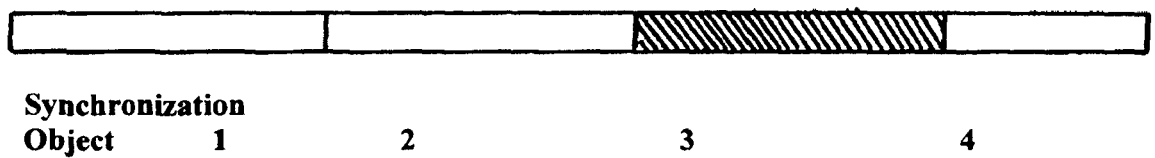
FIG. 2 is a block diagram.

As shown in FIG. 2, the runtime analysis process 100 uses a state bit management scheme. A unique bit is assigned to each synchronization object that is created. A particular set of synchronization objects can be identified by setting the relevant bits. The bit associated with a specific synchronization object may be tracked in a structure that is created when the creation of the synchronization object is intercepted and thereafter set in the resource-specific bit fields when the resource is accessed while that synchronization object is held.

In one particular example, a synchronization object tracking structure (L) includes several fields. A 1L field is used as an identifier used by the CPUT to identify the synchronization object, which can be a handle, identification (ID), and so forth.

A 2L field in the tracking structure (L) is used as a reference to an instance of the aforementioned bit field in which a particular bit, representing the synchronization object, is set.

A 3L field in the tracking structure (L) represents a singleton count indicating a number of resource accesses that have been intercepted while the synchronization object was held and no other synchronization objects were held.

A 4L field in the tracking structure (L) represents a non-singleton count indicating a number of resource accesses that have been intercepted while the synchronization object was held together with other synchronization objects.

A 5L field in the tracking structure (L) represents a reference to a list of call chains. Each call chain may be collected whenever the synchronization object is acquired. A count field associated with each call chain in the list may be incremented when a collected call chain is identical to a previously collected call chain. Based on the count field, the list may be sorted in descending order of call chain popularity (e.g. how often the synchronization object was acquired from the same function with the same call chain).

A 6L field in the tracking structure (L) represents a reference to a list of threads that are currently waiting for the synchronization object, if any are waiting.

A 7L field in the tracking structure (L) represents flags that are set via the analysis process disclosed herein to indicate whether the synchronization object is unused, unnecessary, or potentially unnecessary.

Threads may be tracked on an ordered "thread list," which can be implemented as a skip list, as an AVL tree, or as some other searchable arrangement optimized for fast access. In general, an AVL tree is a height-balanced binary search tree (order O(log n) average time for both average and worst-case operations) for which search operations are performed in logarithmic time, in the same manner as they would be performed for an unbalanced binary search tree, and for which insert and delete operations require rebalancing steps to optimize search efficiency. In general, a skip list is a probabilistic data structure, based on parallel linked lists, with efficiency comparable to a binary search tree (order O(log n) average time for most operations). A skip list is an augmentation of an ordered linked list with additional forward links to nonadjacent list elements selected in a randomized way with a heometric/negative binomial distribution, such that a search through the ordered list elements may skip parts of the list. Insert, search and delete operations are performed in logarithmic randomized time in relation to the number of list elements.

Thread creation can be intercepted using hooks on most systems. For example, using Microsoft Windows®, the interception can occur using a DllMain( ) routine that is invoked with a dwReason parameter that indicates a "thread attach" status. This routine can query the thread's ID and add the thread to the thread list. A thread tracking structure (T) can include several fields, such as a 1T field representing a thread ID or handle. A 2T field in the thread tracking structure (T) serves as a reference to an instance of the synchronization object bit field, in which a bit is set for each object currently held by that thread. A 3T field in the thread tracking structure (T) represents a count of the largest number of those bits ever set at once. A 4T field in the thread tracking structure (T) represents a call chain, to be collected at the time when that count is incremented, i.e., when the largest number of synchronization objects has first been held by that thread.

When a memory block, or some other resource, is allocated, an entry can be created for it in an ordered list, which can be implemented as a skip list, AVL tree, and so forth. A resource tracking structure (B) is used and can include several fields, such as a 1B field representing a pointer to the tracking structure representing the thread that allocated that memory block. A 2B field in the resource tracking structure (B) can serve as a reference to a copy of that thread's synchronization object bit field at the moment of the block's initialization. A 3B field in the resource tracking structure (B) can represent a singleton counter indicating the number of times the block has been accessed while only one synchronization object (the first such) was held.

Optionally, the resource tracking structure (B) can include additional fields. A 4B field in the resource tracking structure (B) can represent a non-singleton counter indicating the number of times the block has been accessed while multiple synchronization objects were held. A 5B field in the resource tracking structure (B) can represent the call chain leading to the block's allocation. A 6B field in the resource tracking structure (B) can represent an address (or other identifier) of the resource and a 7B field can include optional flags.

In one particular example, the runtime analysis process 100 is described in the context of heap memory. In general, heap memory is a changeable area of committed computer main storage (memory) that a program process can use to store data in some variable amount that won't be known until the program is running. Often the most common and troublesome race conditions and deadlocks within multithreaded applications involve objects in heap memory. Stacks are generally thread-specific and data sections of loaded modules are read-only. Memory mapped data is typically shared with other processes and requires process-level synchronization.

The runtime analysis process 100 analyzes a running program and reports the following two situations. First, where many synchronization objects are held simultaneously to overprotect a particular shared resource. Such a situation is unnecessarily ripe for deadlocks. Second, where a synchronization object is created but rarely or never held independently of other synchronization objects. Such a situation lends itself to race conditions caused by the software developers' ineffective use of synchronization objects, as described above. When such a synchronization object is most often held simultaneously with other synchronization objects, as described in the first situation, the situation is also unnecessarily ripe for deadlocks.

In one particular example, API wrappers and read/write interception work as they do for IBM Rational Purify. Runtime analysis routines track threads as they are created and terminated, in DllMain( ), for example. Runtime analysis routines also track APIs used to create and destroy thread synchronization objects, such as InitializeCriticalSection( ). In those API wrappers, runtime analysis routines track the existing synchronization objects in an ordered list, which can be implemented as a skip list, AVL tree, and so forth. These routines associate the list entry for each of these objects with a bit in a bit field (one unique bit for each tracked synchronization object). Thus, for each synchronization object, an entry (L, as described above) is tracked in an ordered list, which can be implemented as a skip list, AVL tree, and so forth. Runtime analysis process 100 also wraps thread synchronization APIs such as EnterCriticalSection( ) and LeaveCriticalSection( ). In those API wrappers, the synchronization objects held by each thread at any given time are tracked; for each thread, an entry (T, as described above) is tracked in an ordered list. The runtime analysis routines invoked from those API wrappers intercept and track memory allocations and deallocations; for each allocated memory block, an entry (B, as described above) is tracked in an ordered list, which can be implemented as a skip list, AVL tree, and so forth.

Figure 3:
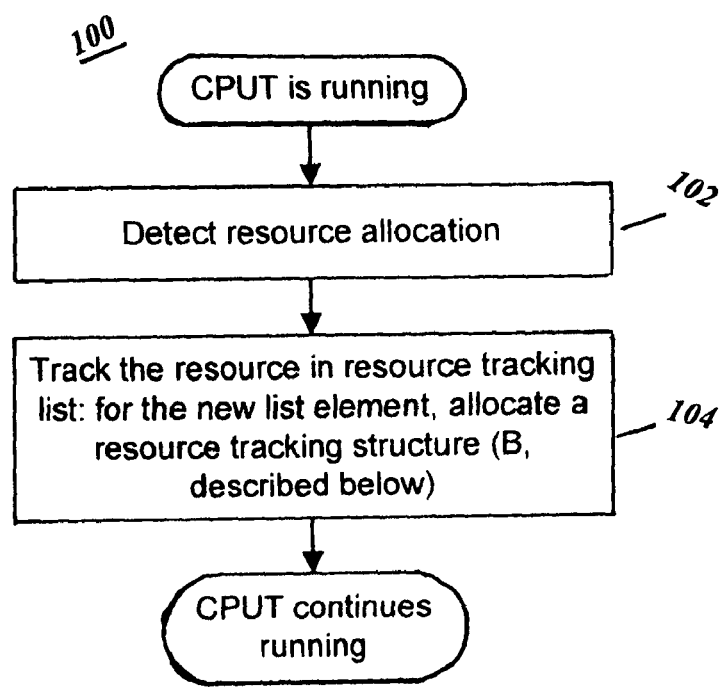
FIGS. 3-15 are flow diagrams.
Like reference numbers and designations in the various drawings indicate like elements.

As shown in FIG. 3, as the CPUT is executing, a runtime analysis intercept routine (100) detects (102) resource allocation and tracks (104) a resource in a resource tracking list. For each new list element, the routine (100) allocates a resource tracking structure (B).

Figure 4:
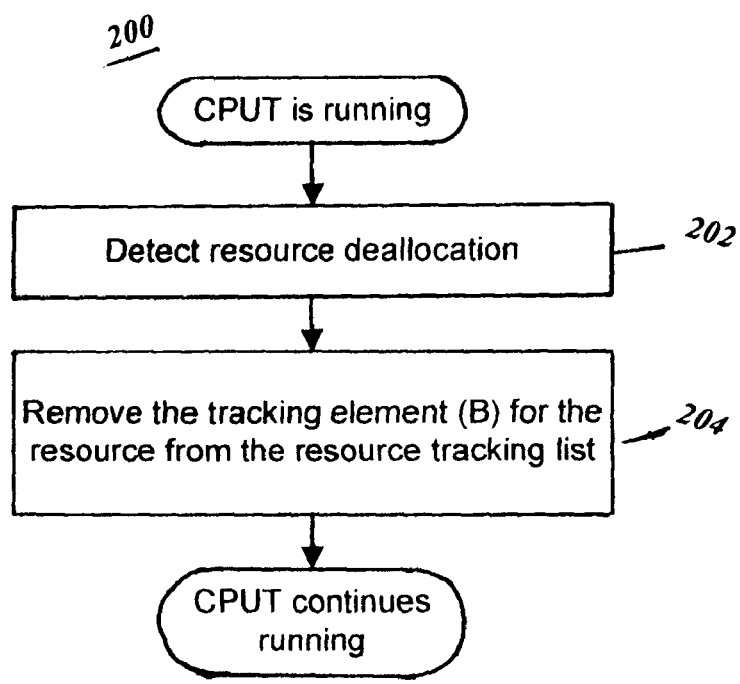

As shown in FIG. 4, as the CPUT is executing, a runtime analysis intercept routine (200) detects (202) resource deallocation and removes (204) the tracking element (B) from the resource tracking list.

Figure 5:
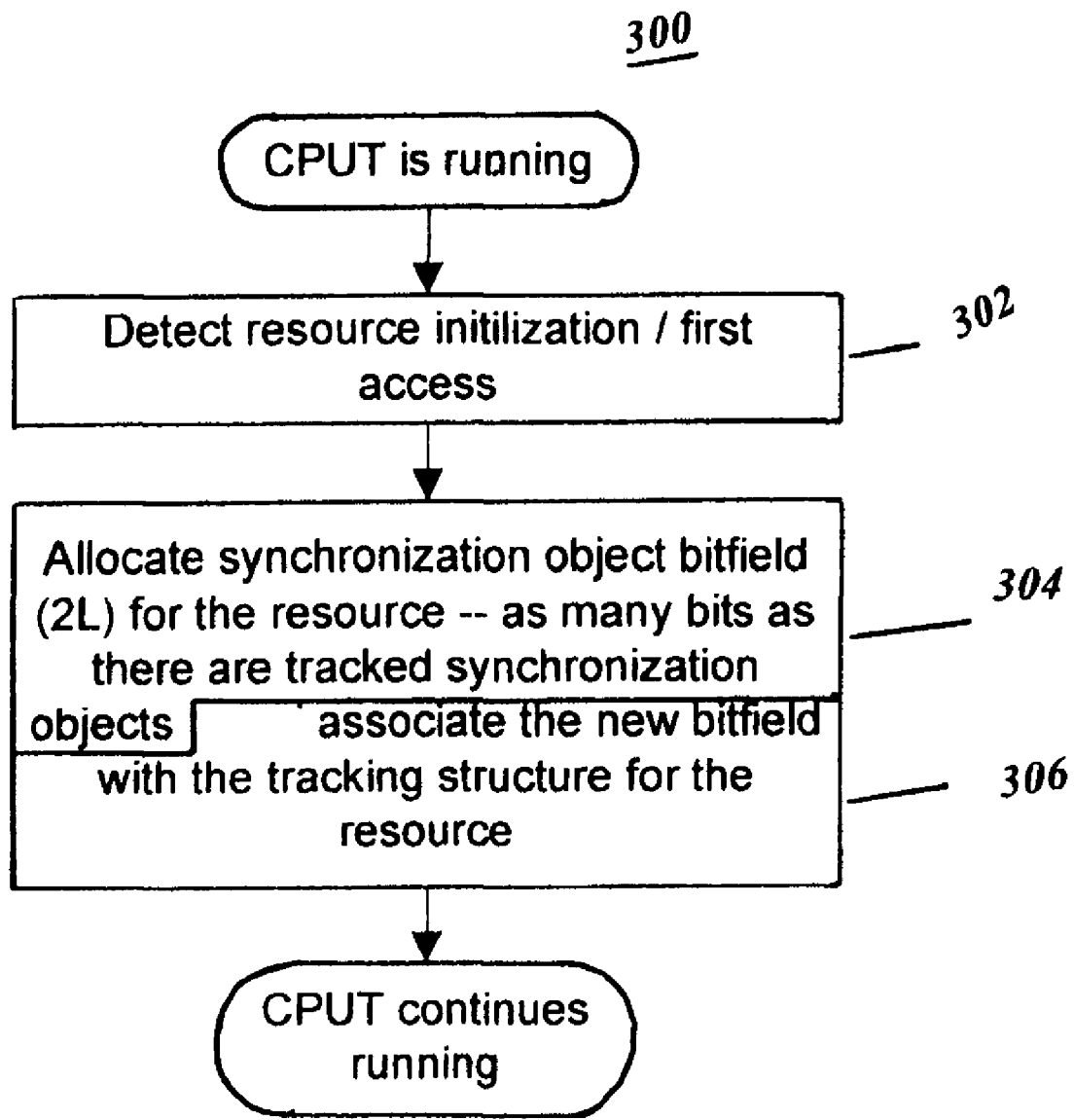

As shown in FIG. 5, as CPUT is executing, a runtime analysis intercept routine (300) detects (302) a resource initialization (e.g., first access). Subprocess 300 allocates (304) a synchronization bit field (2L) for the resource (e.g., as many bits as there are tracked synchronization objects). The routine (300) associates (306) the new bit field with the tracking structure for the resource.

Figure 6:
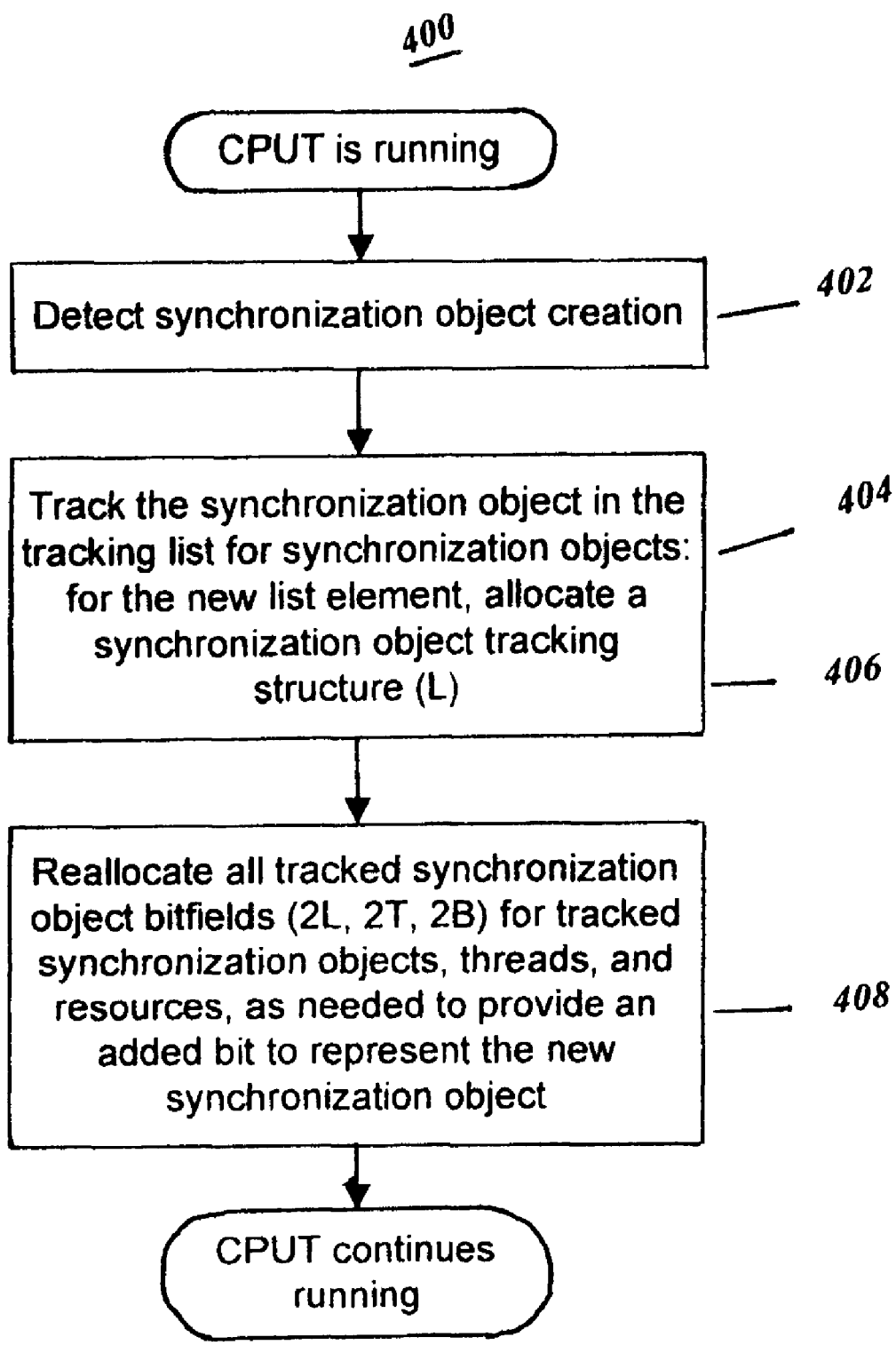

As shown in FIG. 6, a runtime analysis intercept routine (400) detects (402) a synchronization object creation. The routine (400) tracks (404) the synchronization object in the tracking list for synchronization objects. For the new element list, the routine (400) allocates (406) a synchronization object tracking structure (L). The routine (400) reallocates (408) all tracked synchronization object bit fields (2L, 2T, 2B) for tracked synchronization objects, threads and resources, as needed to provide an added bit to represent the new synchronization object.

Figure 7:
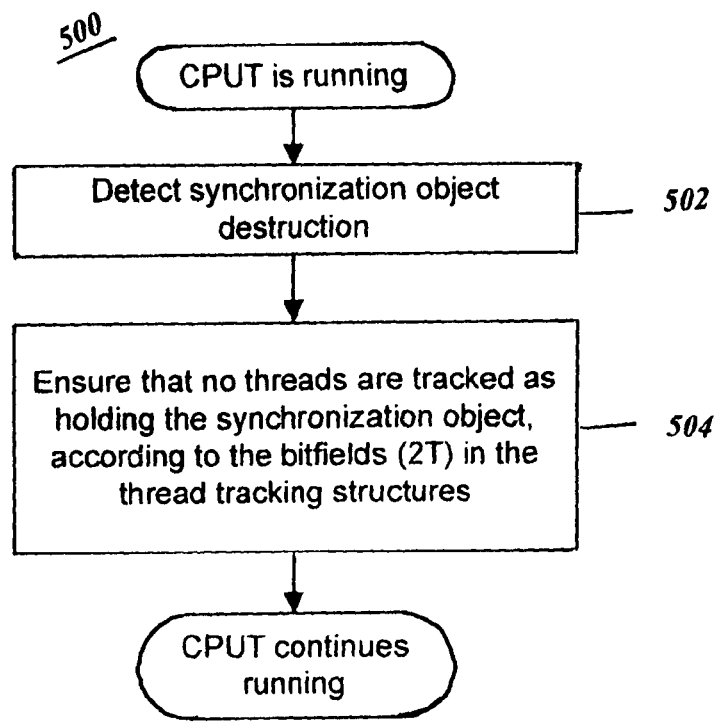

As shown in FIG. 7, a runtime analysis intercept routine (500) detects (502) when a synchronization object is destroyed. The routine (500) ensures (504) that no threads are tracked as holding the synchronization object according to bit fields (2T) in the thread tracking structures.

Figure 8:
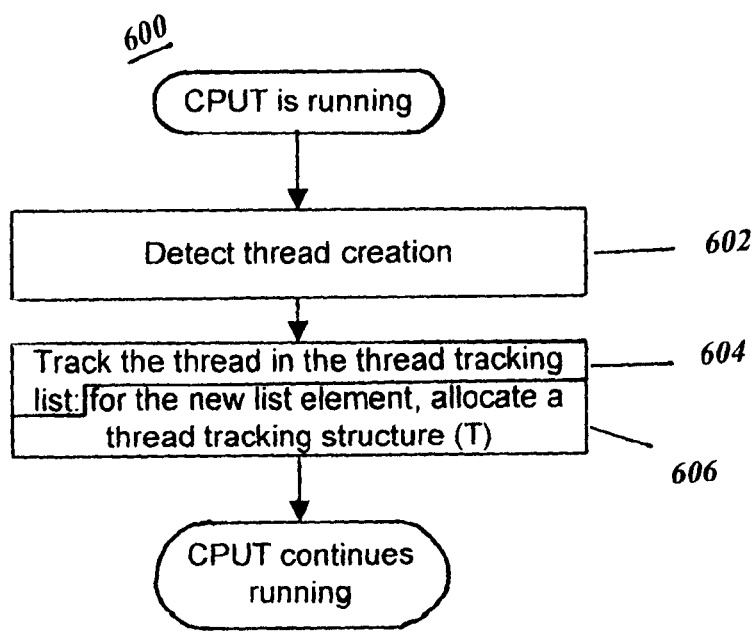

As shown in FIG. 8, a runtime analysis intercept routine (600) detects (602) a thread creation. The intercept routine (600) tracks (604) the thread in the thread tracking list. For the new list element, the routine (600) allocates (606) a thread tracking structure (T).

Figure 9:
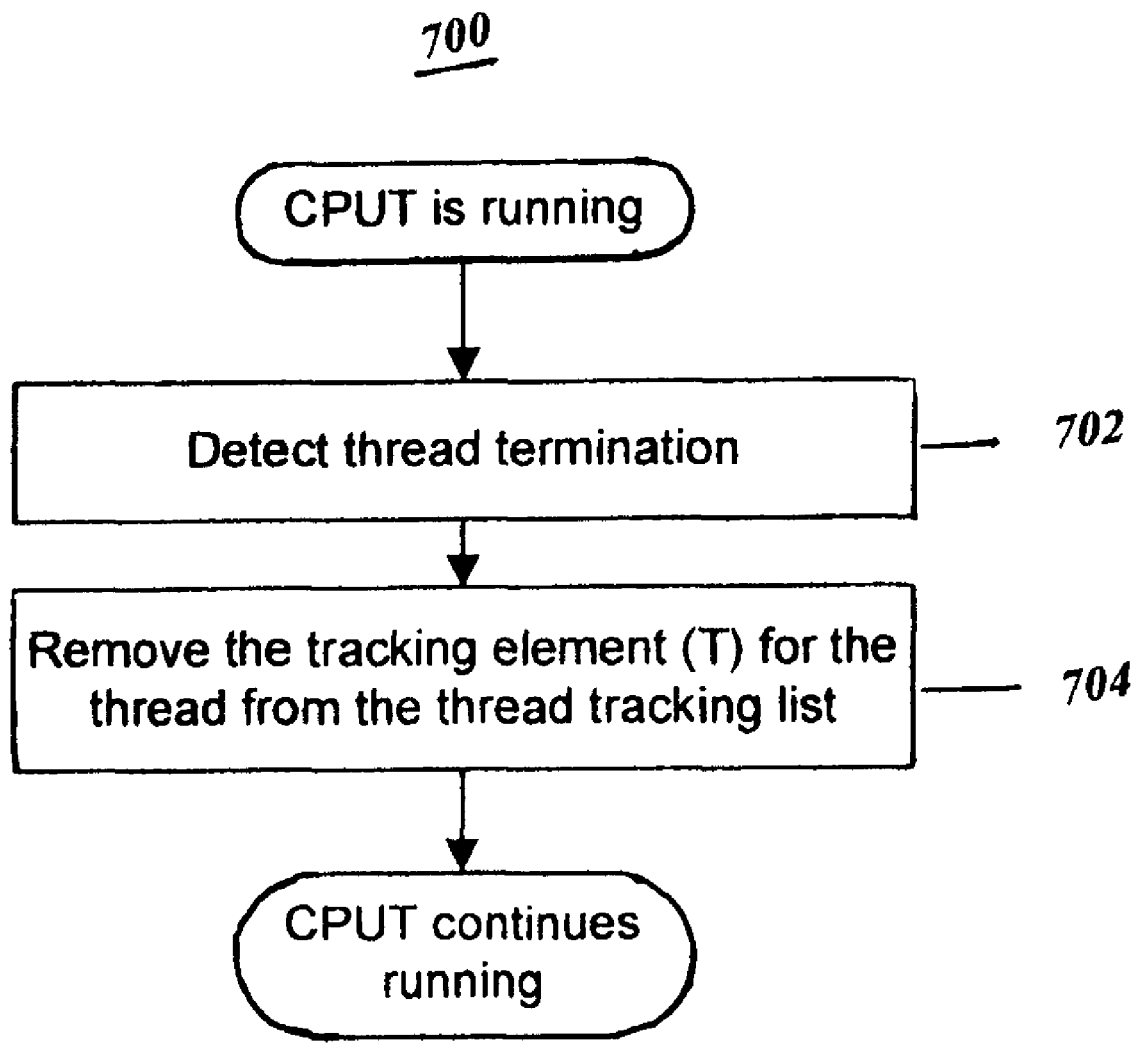

As shown in FIG. 9, a runtime analysis intercept routine (700) detects (702) a thread termination and removes (704) the tracking element (T) for the thread from the thread tracking list.

Figure 10:
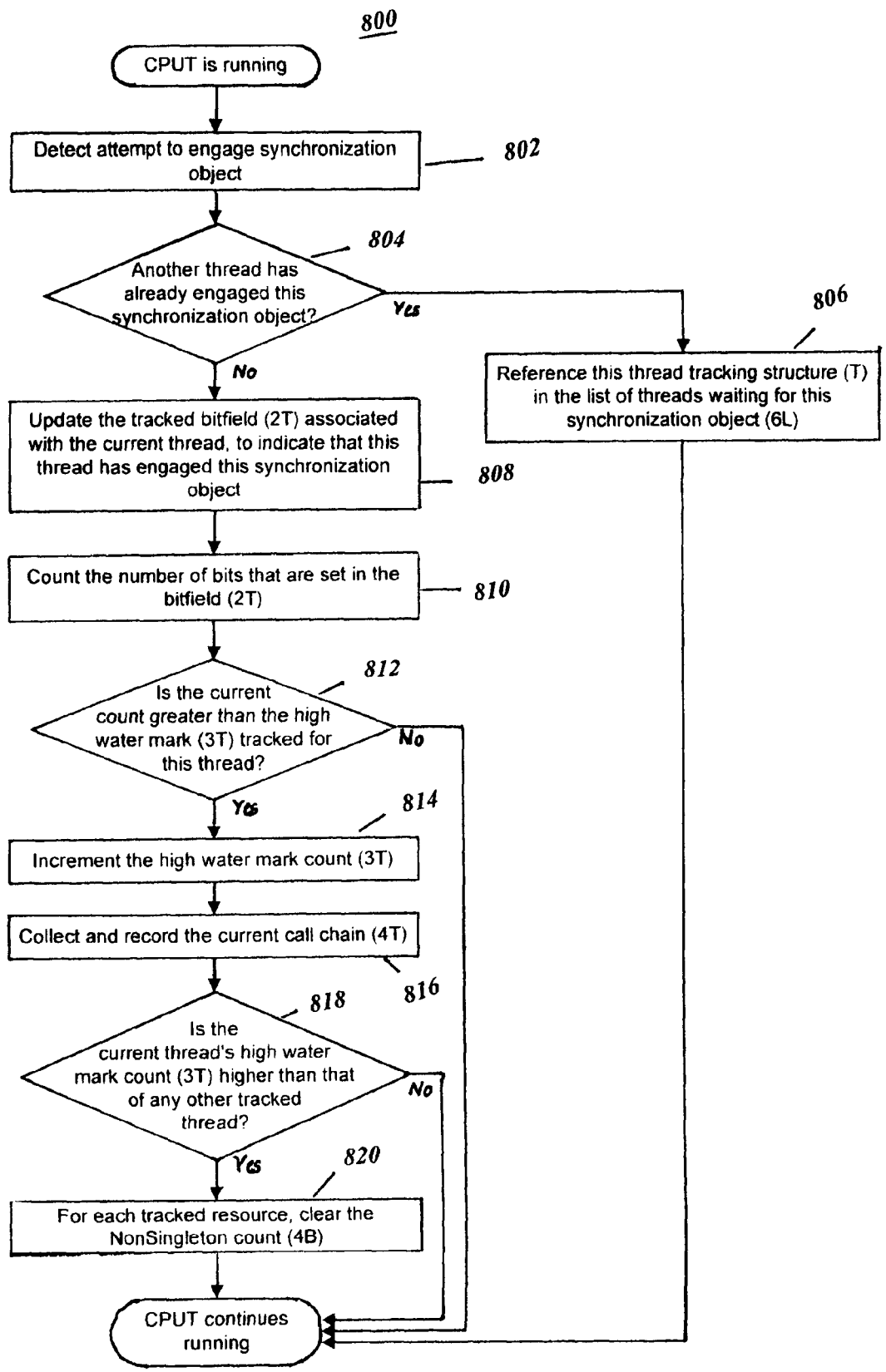

As shown in FIG. 10, a runtime analysis intercept routine (800) detects (802) an attempt to engage a synchronization object. The routine (800) determines (804) whether another thread has already engaged the synchronization object. If another thread has already engaged the synchronization object, the intercept routine (800) references (806) this thread tracking structure (T) in the list of threads waiting for this synchronization object (6L).

If another thread has not already engaged the synchronization object, the intercept routine (800) updates (808) the tracked bit field (2T) associated with the current thread to indicate that this thread has engaged this synchronization object.

The routine (800) counts (810) the number of bits that are set in the bit field (2T) and determines (812) whether the current count is greater than the high water mark (3T) tracked for this thread.

If the current count is greater than the high water mark (3T) tracked for this thread, the routine (800) increments (814) the high water mark count (3T) and collects and records (816) the current call chain (4T).

The routine (800) determines (818) whether the current thread's high water mark count (3T) is higher than that of any other tracked thread. If the current thread's high water mark count (3T) is higher than that of any other tracked thread, the routine (800) clears (820) the non-singleton count (4B) for each tracked resource.

Figure 11:
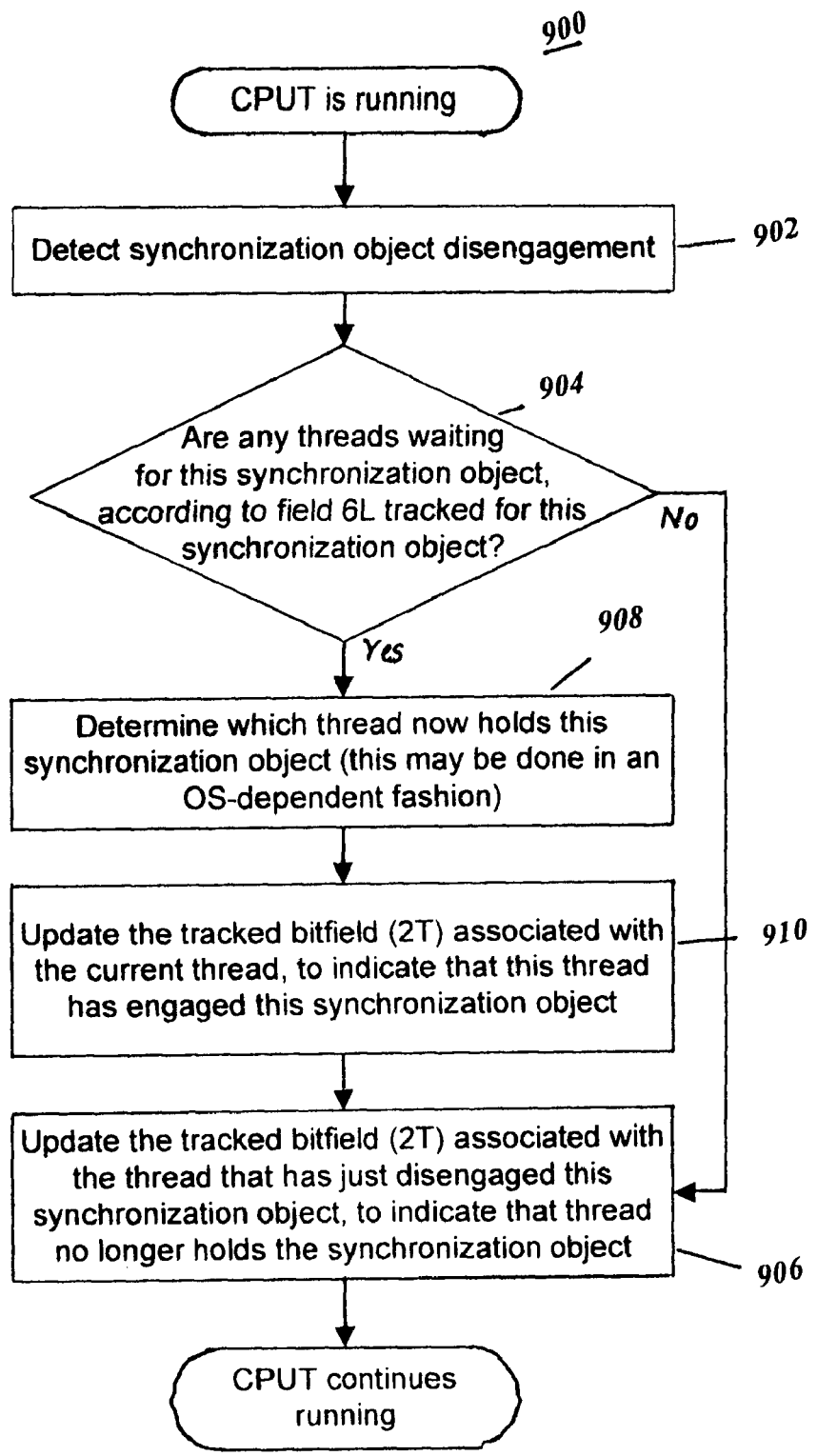

As shown in FIG. 11, a runtime analysis intercept routine (900) detects (902) when a synchronization object is disengaged. The routine (900) determines (904) whether there are any threads waiting for this synchronization object according to field 6L tracked for this synchronization object. If there are no threads waiting for this synchronization object according to field 6L tracked for this synchronization object, the routine (900) updates (906) the tracked bit field (2T) associated with the thread that has just disengaged this synchronization object to indicate that thread no longer holds the synchronization object.

If there are threads waiting for this synchronization object according to field 6L tracked for this synchronization object, the routine (900) determines (908) which thread now holds this synchronization object (e.g., can be done in operating system dependent fashion).

The routine (900) updates (910) the tracked bit field (2T) associated with the current thread to indicate that this thread has engaged this synchronization object. The routine (900) updates (906) the tracked bit field (2T) associated with the thread that has just disengaged this synchronization object to indicate that thread no longer holds the synchronization object.

Figure 12:
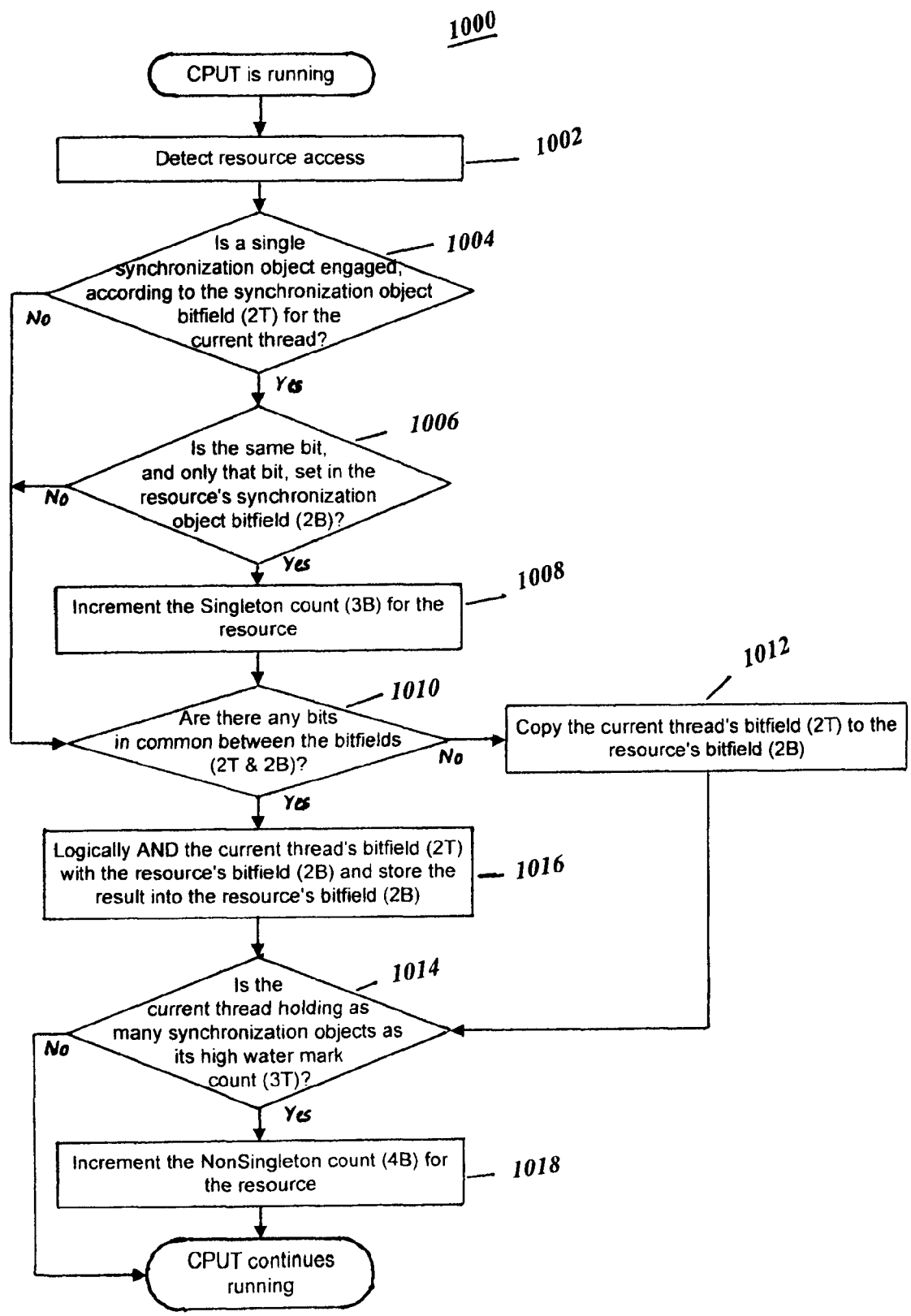

As shown in FIG. 12, the runtime analysis intercept routine (1000) detects (1002) a resource access. The routine (1000) determines (1004) whether a single synchronization object is engaged according to the synchronization object bit field (2T) for the current thread. If a single synchronization object is engaged according to the synchronization object bit field (2T) for the current thread, the routine (1000) determines (1006) whether the same bit, and only that bit, is set in the resource's synchronization object bit field (2B). If the same bit, and only that bit, is set in the resource's synchronization object bit field (2B), the routine (1000) increments (1008) the singleton count (3B) for the resource.

If a single synchronization object is not engaged according to the synchronization object bit field (2T) for the current thread or the same bit, and only that bit, is no set in the resource's synchronization object bit field (2B), then the routine (1000) determines (1010) whether there are any bits in common between the bit fields (2T and 2B). If there are no bits in common between the bit fields (2T and 2B), the routine (1000) copies (1012) the current thread's bit field (2T) to the resource's bit field and determines (1014) whether the current thread is holding as many synchronization objects as is high water count (3T).

If there are bits in common between the bit fields (2T and 2B), the routine (1000) logically ANDs (1016) the current thread's bit field (2T) with the resource's bit field (2B) and stores the result into the resource's bit field (2B).

If the current thread is holding as many synchronization objects as its high water count (3T), the routine (1000) increments (1018) the non-singleton count (4B) for the resource.

Figure 13:
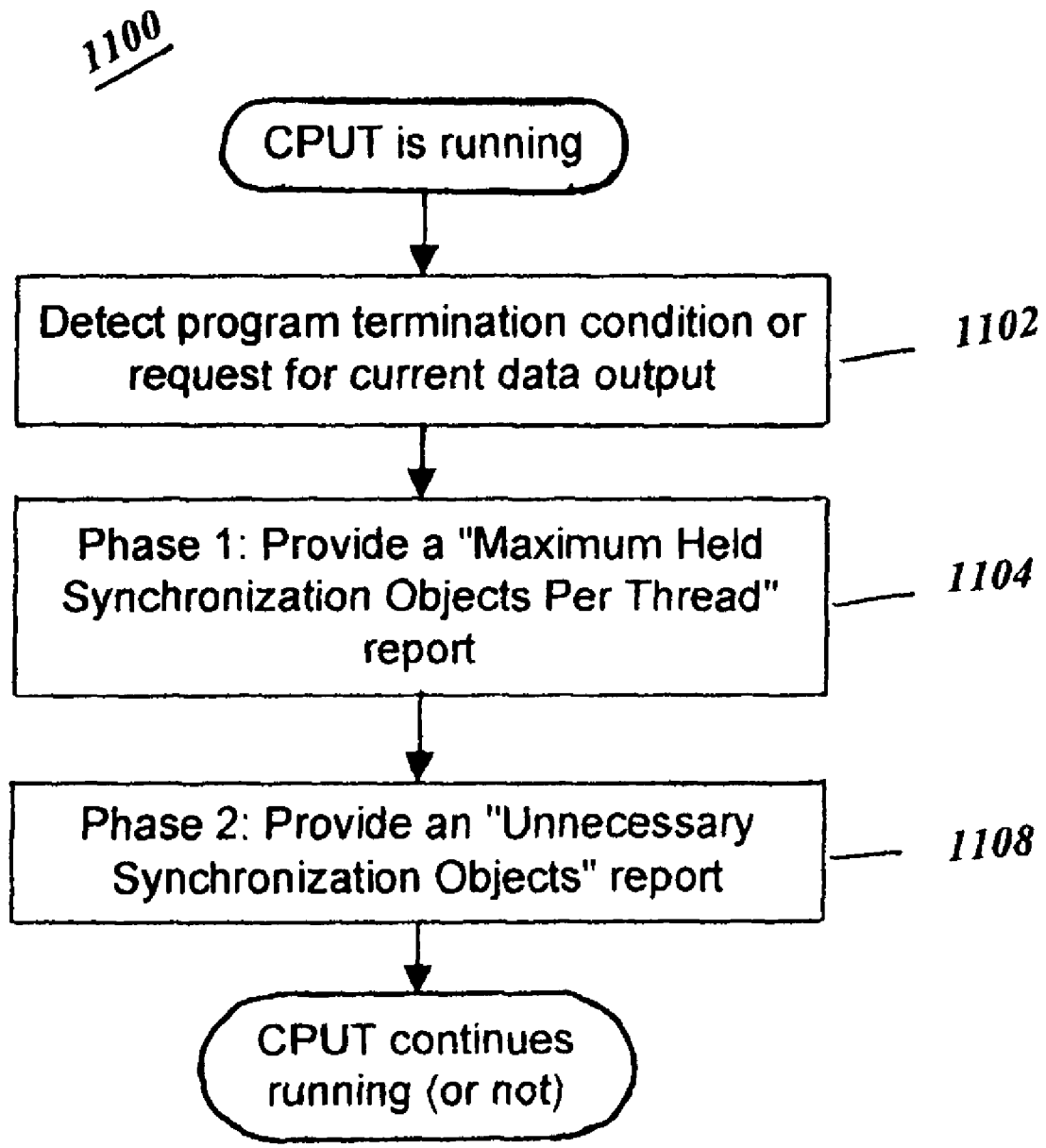

As shown in FIG. 13, the runtime analysis intercept routine (1100) includes detecting (1102) a program termination or request for current data output. The routine (1100) executes (1104) a phase 1 subroutine (1106) and executes (1108) a phase 2 subroutine (1110).

Figure 14:
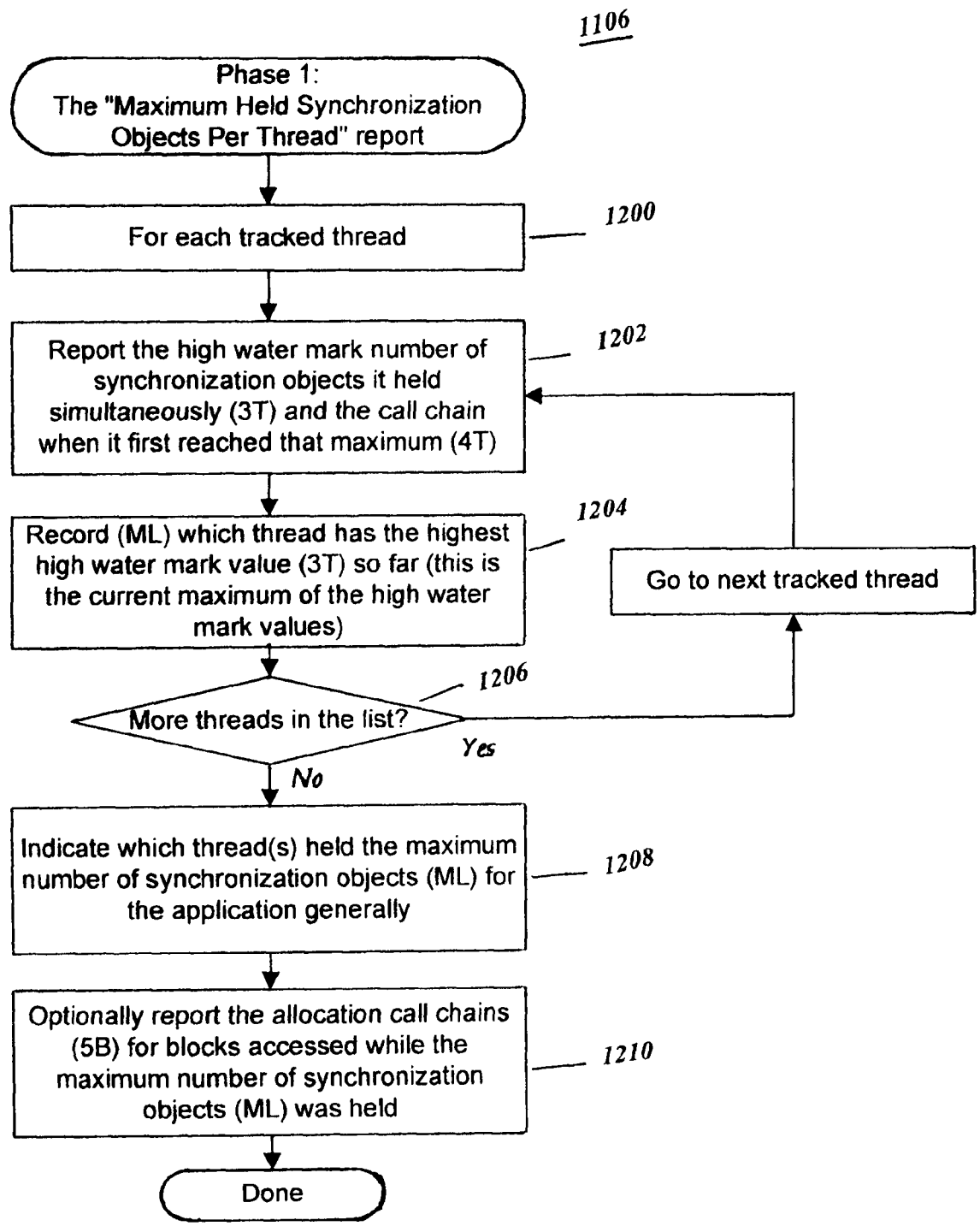

As shown in FIG. 14, subroutine 1106 includes, for each tracked thread (1200), reporting (1202) the high water mark number of synchronization objects it held simultaneously (3T) and the call chain when it first reached the maximum (4T), and recording (1204) which thread has the highest high water mark value (3T) so far (i.e., the current maximum of the high water mark values), while there are more threads in the list (1206).

If there are no more threads in the list, subroutine 1106 indicates (1208) which thread(s) held the maximum number of synchronization objects (ML) for the application generally and optionally reports (1210) the allocation call chains (5B) for blocks accessed while the maximum number of synchronization objects was held.

Figure 15:
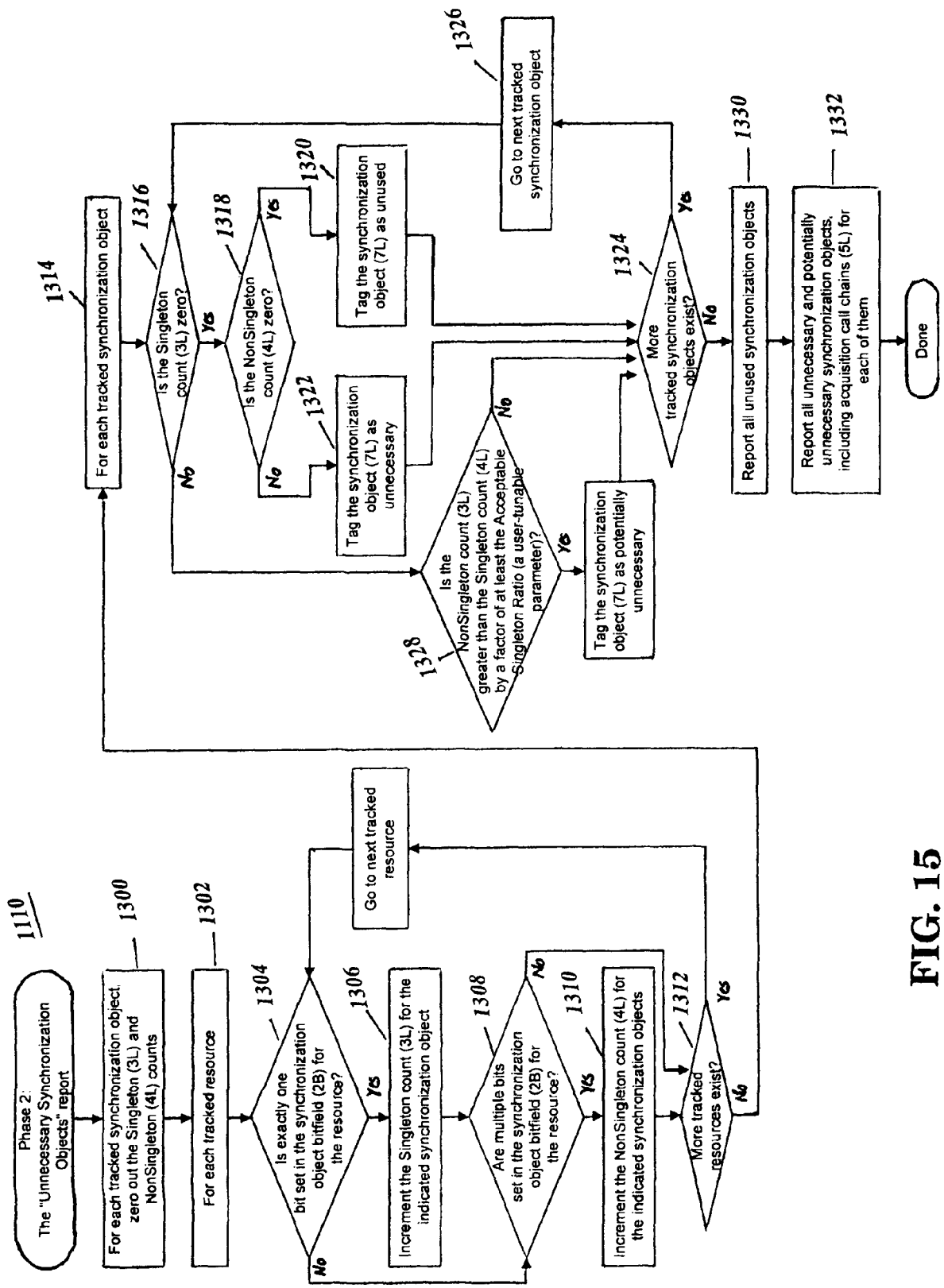

As shown in FIG. 15, subroutine 1110 includes, for each tracked thread synchronization object, zeroing out (1300) the singleton (3L) and non-singleton (4L). For each tracked resource (1302), subroutine 1110 determines (1304) whether there is exactly one bit set in the synchronization object bit field (2B) for the resource.

If there is exactly one bit set in the synchronization object bit field (2B) for the resource, subroutine 1110 increments (1306) the singleton count (3L) for the indicated synchronization object.

Subroutine 1110 determines (1308) whether there are multiple bits set in the synchronization object bit field (2B) for the resource. If there are multiple bits set in the synchronization object bit field (2B) for the resource, subroutine 1110 increments (1310) the non-singleton count (4L) for the indicated synchronization objects.

If no more tracked resources exist (1312), for each tracked synchronization object (1314), subroutine 1110 determines (1316) whether the singleton count (3L) is zero.

If the singleton count (3L) is zero, subroutine 1110 determines (1318) whether the non-singleton count (4L) is zero. If the non-singleton count (4L) is zero, subroutine 1110 tags (1320) the synchronization object (7L) as unused. If the non-singleton count (4L) is not zero, subroutine 1110 tags (1322) the synchronization object (7L) as unnecessary. Subroutine 1110 determines (1324) whether more tracked synchronization objects exist. If more tracked synchronization objects exist, subroutine 1110 goes (1326) to the next tracked synchronization object and repeats the foregoing necessity determination logic (1316) for that next tracked synchronization object.

If the singleton count (3L) is not zero, subroutine 1110 determines (1328) whether the non-singleton count (3L) is greater than the singleton count (4L) by a factor of at least the acceptable singleton ratio (a user-tunable parameter). If the non-singleton count (3L) is greater than the singleton count (4L) by a factor of at least the acceptable singleton ratio, subroutine 1110 tags (1330) the synchronization object (7L) as potentially unnecessary and determines (1324) whether more tracked synchronization objects exist.

If more tracked synchronization objects do not exist, subroutine 1110 reports (1330) all unused synchronization objects and reports (1332) all unnecessary and potentially unnecessary synchronization objects, including acquisition call chains (5L) for each.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-implemented method for determining a usefulness of synchronization objects comprising:
    in a multi-threaded application program, tracking threads as they are created and terminated;
    intercepting application program interfaces (APIs) used to create and destroy thread synchronization objects;
    in API wrappers, tracking existing synchronization objects in a list; and
    associating a list entry for each of the synchronization objects with a unique bit in a bit field.

2. The computer-implemented method of claim 1 further comprising tracking an entry for each synchronization object in an ordered list.

3. The computer-implemented method of claim 2 wherein a list entry is associated with a data structure comprising:
    a field used as an identifier to identify that synchronization object;
    a bit field in which a particular bit uniquely representing that synchronization object is set;
    a field representing a singleton count indicating a number of resource accesses that have been intercepted while that synchronization object was held and no other synchronization objects were held;
    a field representing a non-singleton count indicating a number of resource accesses that have been intercepted while that synchronization object was held together with other synchronization objects;
    a field representing a reference to a list of call chains;
    a field representing a reference to a list of threads that are currently waiting for that synchronization object, if any are waiting; and
    a field representing flags to indicate whether that synchronization object is unused, unnecessary, or potentially unnecessary.

4. The computer-implemented method of claim 2 further comprising:
    intercepting thread synchronization APIs;
    in each of the intercepted thread synchronization APIs, tracking synchronization objects held by each thread at any given time; and
    for each tracked thread synchronization object, tracking an entry in an ordered list.

5. The computer-implemented method of claim 4 wherein the list entry is associated with a data structure comprising:
    a field representing a thread ID or handle;
    a field representing an instance of the synchronization object bit field, with a bit set for each synchronization object currently held by that thread;
    a field representing a count of the largest number of those bits ever set at once; and
    a field representing a call chain, to be collected at the time when that count is incremented.

6. The computer-implemented method of claim 4 further comprising:
    intercepting and tracking resource allocations and deallocations; and
    for each allocated resource, tracking a list entry in an ordered list.

7. The computer-implemented method of claim 6 wherein the list entry is associated with a data structure element comprising:
    a field representing a reference to the tracking structure representing the thread that allocated that resource;
    a field representing a copy of that thread's synchronization object bit field at the moment of the resource's initialization or initial access; and
    a field representing a singleton counter indicating the number of times the resource has been accessed while only one synchronization object was held.

8. The computer-implemented method of claim 7 wherein the data structure element further comprises:
    a field representing a non-singleton counter indicating the number of times the resource has been accessed while multiple synchronization objects were held;
    a field representing a call chain leading to the resource's allocation;
    a field representing an address of the resource; and
    a field including optional flags.

9. The computer-implemented method of claim 6 further comprising intercepting resource accesses.

10. A computer program product, tangibly embodied in an information carrier, for identifying ineffective utilization of synchronization objects in an application program, the computer program product being operable to cause data processing apparatus to:
    in a multi-threaded application program, track threads as they are created and terminated;
    intercept application program interfaces (APIs) used to create and destroy thread synchronization objects;
    in API intercept routines, track existing synchronization objects in an ordered list; and
    associate a list entry representing each of the synchronization objects with a unique bit in a bit field.

11. The computer program product of claim 10 further causing data processing apparatus to:
    track an entry for each synchronization object in an ordered list.

12. The computer program product of claim 11 wherein a list entry is associated with a data structure element comprising:

a field used as an identifier to identify that synchronization object;

a bit field in which a particular bit uniquely representing that synchronization object is set;

a field representing a singleton count indicating a number of resource accesses that have been intercepted while that synchronization object was held and no other synchronization objects were held;

a field representing a non-singleton count indicating a number of resource accesses that have been intercepted while that synchronization object was held together with other synchronization objects;

a field representing a reference to a list of call chains;

a field representing a reference to a list of threads that are currently waiting for that synchronization object, if any are waiting; and a field representing flags to indicate whether that synchronization object is unused, unnecessary, or potentially unnecessary.

13. The computer program product of claim 11 further causing data processing apparatus to:

intercept thread synchronization APIs;

in each of the intercepted thread synchronization APIs, track synchronization objects held by each thread at any given time; and for each thread synchronization API wrapper, track an entry in an ordered list.

14. The computer program product of claim 13 wherein the list entry is associated with a data structure element comprising:

a field representing a thread ID or handle;

a field representing an instance of the synchronization object bit field, with a bit set for each synchronization object currently held by that thread;

a field representing a count of the largest number of those bits ever set at once; and a field representing a call chain, to be collected at the time when that count is incremented.

15. The computer program product of claim 13 further causing data processing apparatus to:

intercept and track resource allocations and deallocations; and for each allocated resource, track an entry in an ordered list.

16. The computer program product of claim 15 wherein the list entry is associated with a data structure element comprising:

a field representing a reference to the tracking structure representing the thread that allocated that resource;

a field representing a copy of that thread's synchronization object bit field at the moment of the resource's initialization or initial access; and a field representing a singleton counter indicating the number of times the resource has been accessed while only one synchronization object was held.

17. The computer program of claim 16 wherein the data structure element further comprises:

a field representing a non-singleton counter indicating the number of times the resource has been accessed while multiple synchronization objects were held;

a field representing a call chain leading to the resource's allocation;

a field representing an address of the resource; and a field including optional flags.

18. The computer program product of claim 15 further causing data processing apparatus to:

intercept resource accesses.

\* \* \* \* \*